United States Patent [19]

Buhler

[11] 3,908,170

[45] Sept. 23, 1975

[54] HYBRID VIDEO AMPLIFIER

[75] Inventor: Frederick T. Buhler, Newark, Calif.

[73] Assignee: Philco-Ford Corporation (Now Aeronutronic Ford Corporation), Blue Bell, Pa.

[22] Filed: Dec. 9, 1974

[21] Appl. No.: 530,754

[52] U.S. Cl. .......................... 330/3; 330/15; 330/18; 330/28

[51] Int. Cl.$^2$ .......................................... H03F 5/00

[58] Field of Search ............... 330/3, 18, 15, 17, 20, 330/28

[56] References Cited

UNITED STATES PATENTS 3,253,225 5/1966 Dalton et al. .......................... 330/3

*Primary Examiner*—James B. Mullins

*Attorney, Agent, or Firm*—Robert D. Sanborn

[57] ABSTRACT

A high performance video amplifier employs a vacuum tube output stage and a transistor driver. A complementary pair of transistors is series connected into the tube cathode circuit and the pair is driven by a differential driver amplifier. The video input is applied to one input of the differential amplifier and the other input is connected to a cathode current sensing resistor to stabilize the amplifier.

6 Claims, 1 Drawing Figure

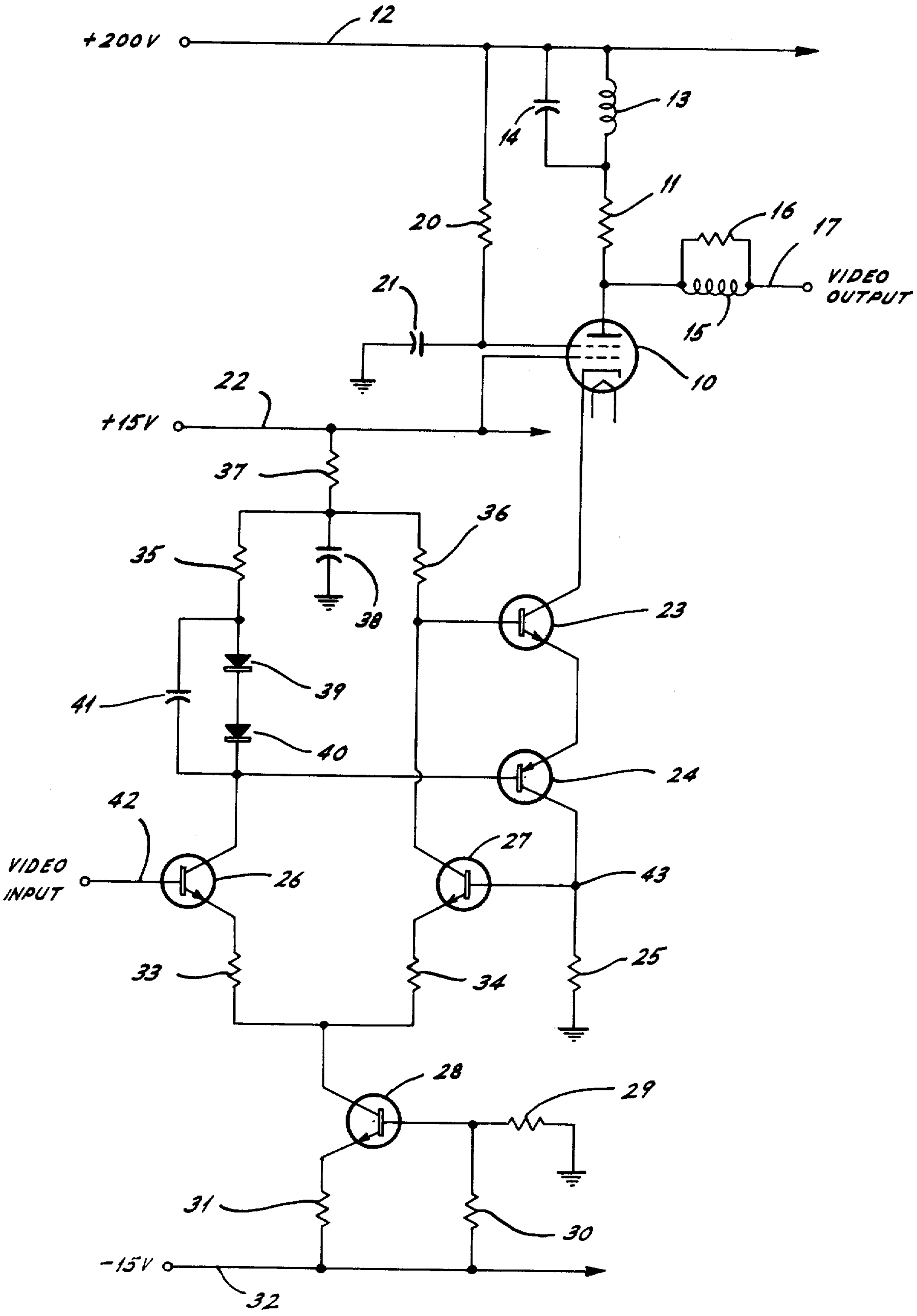
+200V
12
13
14
11
20
16
17
VIDEO OUTPUT
21
15
10
22
+15V
37
36
35
38
23
39
41
40
24
42
27
VIDEO INPUT
26
43
33
34
25
28
29
31
30
-15V
32

HYBRID VIDEO AMPLIFIER

DESCRIPTION OF THE PRIOR ART

In the prior art, vacuum tube amplifiers have been preferred where it is intended to drive a cathode ray tube (CRT) displays, particularly those which operate at high d-c voltage. In the projection type of CRT display very high d-c voltages may be employed. For example in a conventional, direct-view monochrome display the CRT may operate under 20 kv. A direct-view color CRT may operate in the 25 to 30 kv range and a projection CRT may operate in the 50 kv region. At the higher voltages it has been found virtually impossible to avoid high voltage arcs in the CRTs. The higher the voltage, the more difficult it is to avoid arcing and the more damaging the arcs become particularly to circuits connected to the CRT electrodes, such as the video driver. In conventional practice arc protectors are incorporated into the CRT display structure. The most efficient of these take the form of a group of gaps or gas-filled arrestors connected between CRT electrode terminals and ground. Preferably the arrestors are mounted directly on the CRT socket and returned as directly as possible to the CRT ground return. These measures have proven effective in CRT's operating at up to 27–30 kv and are sufficiently effective to permit the use of solid-state video drivers. However at 50 kv, the range used in projection CRT displays, such measures have not proven to be sufficiently effective. Accordingly vacuum tube video amplifiers have been used extensively. Typically the vacuum tube amplifier is connected to the CRT and driven by a solid state or transistor pre-amplifier. Numerous configurations have been developed but most suffer from one or more drawbacks. Transistors do not match well with vacuum tubes and they operate at substantially different bias levels. Furthermore, the response of transistors to changes in ambient temperature is totally unlike that of vacuum tubes.

SUMMARY OF THE INVENTION

It is an object of the invention to provide a hybrid video amplifier having an arc resistant vacuum tube output stage and a wide bandwidth transistor driver.

It is a further object to combine transistors with a vacuum tube to take advantage of the best characteristics of both types of device in a video amplifier.

These and other objects are achieved in a video amplifier circuit arranged in the following manner. A power tetrode vacuum tube is connected as a video power amplifier, the output of which is intended for connection to a projection type of CRT display. A pair of complementary transistors in emitter to emitter configuration are series connected into the amplifier cathode circuit. A relatively small value current sensing resistor completes the series transistor circuit to ground. The complementary transistors are differentially driven, so that their emitter to collector impedances are parallel driven, by means of a differential transistor amplifier. The non-inverting input is connected to the current sensing resistor to provide bias stabilization. The inverting input is connected to the video drive input with a zero voltage output current cutoff reference point.

The above-described amplifier system has the large gain-bandwidth characteristics and high gain associated with transistors along with the arc resistant characteristics associated with vacuum tubes. The built-in feedback makes the amplifier quite stable and linear.

BRIEF DESCRIPTION OF THE DRAWING

The single FIGURE of drawing is a schematic diagram of the circuit of the invention.

DESCRIPTION OF THE INVENTION

Referring to the drawing, vacuum tube 10 is a power amplifier tetrode selected to provide the required video output. Load resistor 11 is chosen for the desired bandwidth in conjunction with tube 10. A 200-volt power supply (not illustrated) powers the video drive as indicated by 200-volt line 12. All power supplies used in the drawing are referenced to ground. Inductor 13 and capacitor 14 provide tuned shunt peaking for video compensation, while inductor 15 damped by resistor 16 provides series peaking video compensation. Output terminal 17 is, in the preferred embodiment, adapted for connection to the cathode of a projection CRT (not illustrated) which operates at 50 kv and is subject to energetic arcs as a normal course of operation. Resistor 20 and capacitor 21 act as a decoupling filter to connect the screen grid of tube 10 to the +200-volt power supply line 12.

Tube 10 is cathode driven. Its grid is returned to +15-volt line 22. The d-c cathode potential will be set by the transistor portion of the circuit to provide the bias required by the tube. NPN transistor 23 and PNP transistor 24 form a complementary pair connected in emitter-to-emitter relation in series with the cathode of tube 10. The pair is poled so as to be properly conductive of the cathode current of tube 10. Resistor 25 completes the cathode circuit to ground and is of a low resistance relative to the conduction impedance of transistors 23 and 24. Its function is to develop a voltage directly and linearly proportional to the cathode current of tube 10.

Transistors 23 and 24 are differentially driven in push-push operation by a differential amplifier comprised of transistors 26 and 27. Transistor 28 along with biasing resistors 29, 30 and 31 provides a constant-current emitter source for the differential amplifier excited from the −15-volt power supply line 32. Small value resistors 33 and 34 are emitter balancing resistors. The collector of transistor 26 directly drives the base of PNP transistor 24, while the collector of transistor 27 directly drives the base of NPN transistor 23. A pair of equal value resistors 35 and 36 comprise the load resistors of the differential amplifier and return the collectors of transistors 26 and 27 to the +15-volt power supply line 22 through decoupling resistor 37. Capacitor 38 bypasses resistor 37 to ground at high frequencies.

Forward biased diodes 39 and 40 provide a constant voltage drop that acts to equalize the conduction of transistors 26 and 27 when the differential amplifier is balanced. Capacitor 41 acts as a high frequency signal bypass across diodes 39 and 40.

In terms of the transistor portion of the amplifier, it can be seen that a signal at input 42 will be inverted once through transistor 26 and applied to transistor 24. Transistor 24, acting as an emitter follower, will transfer its current to the tube 10 cathode circuit. Through differential transistor amplifier action, by way of transistor 27, the input from line 42 will appear uninverted at the collector of transistor 27 where it drives the base of transistor 23. Transistor 23 provides a signal inversion and its current too contributes to the cathode current of tube 10 along with the contribution of transistor 24. Thus as far as the output of tube 10 is concerned input line 42 is a signal inverting input.

The differential amplifier has a non-inverting input at point 43 which is connected to current sensing resistor 25. The voltage present at point 43 will be amplified and transduced through the transistor amplifiers but it will be noted that the amplifier output transduced back to resistor 25 will be out of phase thereby introducing heavy negative feedback. Thus the cathode current in tube 10, acting on resistor 25, will be highly stabilized by the feedback introduced by way of the transistor amplifier.

In terms of signal input into line 42, any signal input will be matched by a nearly equal signal appearing at point 43. This means that as a signal is applied to input line 42, an almost exact duplicate will appear at point 43 thereby showing that the input voltage is transduced into a tube 10 cathode current. The current being applied to tube 10 is a very linear replica of the input voltage. Since tube 10 is cathode driven, the video output voltage on line 17 will be an amplified and inverted replica of the input voltage. The voltage gain from line 42 to line 17 will be approximately equal to the ratio of resistor 11 to resistor 25. Thus, since resistor 11 is established in value to provide the desired video output, the value of resistor 25 can be selected to provide the desired amplifier gain. When the input voltage at line 42 is zero, the potential at point 43 will also be at nearly zero and tube 10 will be cut off. The output potential on line 17 will be at +200 volts. As line 42 is driven in a positive direction, the potential at point 43 will closely follow it and the potential at line 17 will fall at a linear ratio until tube 10 approaches saturation.

EXAMPLE

The circuit of the drawing was constructed using the following component values:

Tube 10 - Type 8458 (two halves connected in parallel)
Resistor 11 - 430 ohms (50 watts)
Inductor 13 - 1 μ henry
Capacitor 14 - 5 p farads
Inductor 15 - 3μ henrys
Resistor 16 - 1.2 k ohms
Resistor 20 - 10 ohms
Capacitor 21 - 0.01 μ farad
Transistors 23, 26 and 27 - MM8009 (Motorola)
Transistor 24 - 2N5583
Resistor 25 - 3.5 ohms
Resistor 29 - 2 k ohms
Resistor 30 - 1 k ohms
Resistor 31 - 200 ohms
Resistor 33 - 3 ohms
Resistor 34 - 3 ohms
Resistors 35, 36 and 37 - 150 ohms
Capacitor 38 - 0.1 μ farad
Diodes 39, 40 - 1N4942
Capacitor 41 - 0.1 μ farad The amplifier had a gain of 100 and a maximum output level of 100 volts peak-to-peak. The video bandwidth was from d-c to 60 MHz. The drive was adequate for a 50 kv projection type CRT display. The amplifier was not damaged by repeated CRT arcing.

A hybrid amplifier having performance considerably superior to prior art amplifiers has been described and an operating example shown. Equivalents and alternatives will naturally occur to a person skilled in the video amplifier art. Accordingly it is intended that the invention be limited only by the following claims.

I claim:

1. A transistor vacuum tube hybrid video amplifier comprising a vacuum tube having an output load resistor from which an output signal is taken and a driver circuit connected to vary the current flowing in said tube, said driver circuit comprising:
a pair of complementary transistors connected in series with the cathode of said tube
a differential transistor amplifier connected to said pair to drive said pair differentially, and
means for applying an input signal to at least one of the transistors in said differential amplifier.

2. The amplifier of claim 1 wheren the other transistor in said differential amplifier is connected to a current sensing resistor connected in series with the cathode of said tube whereby the current flowing in said tube is stabilized and the gain of said amplifier approximates the ratio of said load resistor to said current sensing resistor.

3. The amplifier of claim 2 wherein said pair of complementary transistors is connected to a biasing network that include offset biasing means.

4. A video signal amplifier comprising:
a power tetrode vacuum tube output stage having a plate load output resistor and fixed d-c potentials applied between a designated common connection and the screen grid and control grid electrodes,
a series combination of a pair of complementary transistors and a current sensing resistor connected between the cathode electrode of said tube and said common connection,
a differential transistor amplifier having an output circuit connected to directly drive said pair of complementary transistors in push-push operation and a pair of input terminals,
one of said input terminals being connected to said current sensing resistor, and
the other of said input terminals being connected to a signal input terminal for said amplifier.

5. The amplifier of claim 4 wherein said differential transistor amplifier has a directly connected emitter configuration with said emitters being connected to a transistor connected to operate as a constant current source.

6. The amplifier of claim 5 wherein said differential amplifier output circuit includes a constant voltage differential device connected to provide offset bias for said complementary transistors.

* * * * *